(12) United States Patent
Gassner et al.

(10) Patent No.: US 12,306,820 B1
(45) Date of Patent: May 20, 2025

(54) SYSTEM AND METHOD FOR DUPLICATING STRUCTURED DATA IN DATABASE

(71) Applicant: Veeva Systems Inc., Pleasanton, CA (US)

(72) Inventors: Peter Gassner, Pleasanton, CA (US); Jonathan Stone, Olympia, WA (US); Andrew Han, Needham, MA (US); Brian Keith Caufield, Livermore, CA (US)

(73) Assignee: Veeva Systems Inc., Pleasanton, CA (US)

( * ) Notice: Subject to any disclaimer, the term of this patent is extended or adjusted under 35 U.S.C. 154(b) by 100 days.

(21) Appl. No.: 18/358,546

(22) Filed: Jul. 25, 2023

Related U.S. Application Data (60) Provisional application No. 63/429,979, filed on Dec. 2, 2022.

(51) Int. Cl.
*G06F 16/00* (2019.01)
*G06F 16/23* (2019.01)

(52) U.S. Cl.
CPC ........ *G06F 16/235* (2019.01); *G06F 16/2358* (2019.01)

(58) Field of Classification Search
CPC ........ G06F 21/602; G06F 13/20; G06F 21/10; G06F 16/212; G06F 16/242; G06F 16/26; G06F 16/287; G06F 16/248; G06F 16/289; G06F 21/72; G06F 16/21; G06F 16/214; G06F 16/25; G06F 21/44; G06F 40/205; G06F 40/295; G06F 16/30; G06F 16/81; G06F 16/84; G06F 16/2246; G06F 16/2282; G06F 16/24535; G06F 16/24544; G06F 16/2456; G06F 16/904; G06F 3/04842; G06F 3/04845; G06F 3/04847; G06F 3/0486; H04L 63/0823; H04L 9/0894; H04L 63/0435; H04L 63/083; H04L 9/3228; H04W 12/009; H04W 12/041; H04W 12/63; H04W 12/65; H04W 4/80; H04W 4/70; G06T 11/206; G06T 2200/24
See application file for complete search history.

(56) References Cited

U.S. PATENT DOCUMENTS

| | | | |
|---|---|---|---|
| 12,106,187 B2 * | 10/2024 | Hernández | G06N 20/00 |
| 2021/0232560 A1 * | 7/2021 | Mateti | G06F 16/25 |
| 2024/0012912 A1 * | 1/2024 | Zhang | H04L 41/16 |

* cited by examiner

*Primary Examiner* — Shyue Jiunn Hwa (57) ABSTRACT

Systems and methods for duplicating data in a data management system. As data is being updated in the data management system, a copy of the updated data is being written to a table for collecting the data changes. The data changes are flattened by a flattener to generate one or more flat files. A packaging controller may package the one or more flat files and generate a data change file. A listing API may list the data change files that are available. The data change file may be accessed via a data access API.

22 Claims, 8 Drawing Sheets

SYSTEM AND METHOD FOR DUPLICATING STRUCTURED DATA IN DATABASE

BACKGROUND

The subject technology relates generally to database management, and more particularly to improving duplication of structured data.

Users increasingly depend on database systems because of their ubiquitous and managed access, from anywhere, at any time, from any device. Given the huge amount of data managed, it is desirable to provide a system and method for improving duplication of data in database systems.

SUMMARY

The disclosed subject matter relates to a method for duplicating data from a data management system, wherein the data management system comprises a first repository, a second repository and a data duplication controller. The method comprises: writing data changes to a log table for collecting the data changes in the data management system; extracting data changes by a data extractor in the data duplication controller; and running a data flattener in the data duplication controller to generate flattened data for the extracted data changes, and creating a first flat file and a second flat file for the flattened data for the extracted data changes, wherein the first flat file is for a first extract and the second flat file is for a second extract, and wherein the first extract is configured to extract a first object in the data management system and the second extract is configured to extract a second object in the data management system. The method further comprises: receiving the first and second flat files from the data flattener at a first predetermined time interval, and creating a first data change file to package the first flat file and the second flat file for the flattened data for the extracted data changes by a packaging controller in the data duplication controller; and presenting the first data change file with a listing API in the data duplication controller to enable access to the data change file.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

Figure 1A:
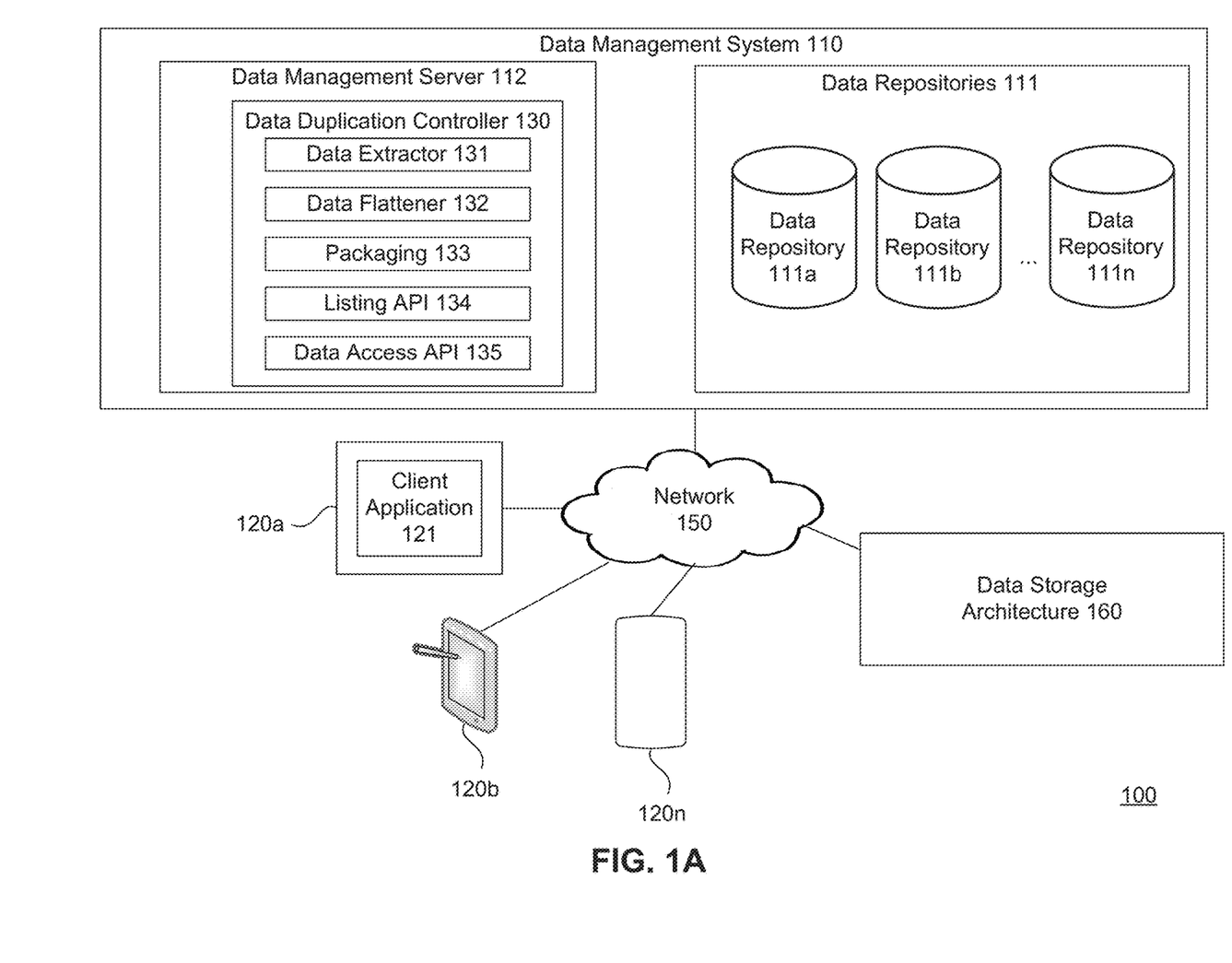
FIG. 1A illustrates an example high level block diagram of a database system architecture wherein the present invention may be implemented.

FIG. 1A illustrates an example high level block diagram of a database management system architecture 100 wherein the present invention may be implemented. As shown, the architecture 100 may include a data management system 110, a plurality of user computing devices 120a, 120b, . . . 120n, and a data storage architecture 160 coupled to each other via a network 150. The data management system 110 may include data repositories 111 and a data management server 112. The data repositories 111 may have two or more data repositories, e.g., 111a, 111b, . . . and 111n. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120a-120n may be any machine or system that is used by a user to access the content management system 110 via the network 150, and may be any commercially available computing devices including laptop computers, desktop computers, mobile phones, smart phones, tablet computers, netbooks, and personal digital assistants (PDAs). A client application 121 may run from a user computing device, e.g., 120a, and access data in the database management system 110 via the network 150. User computing devices 120a-120n are illustrated in more detail in FIG. 4.

The data repositories 111 may store data that client applications (e.g., 121) in user computing devices 120a-120n may access and may be any commercially available storage devices.

The data management server 112 is typically a remote computer system accessible over a remote or local network, such as the network 150. The data management server 112 could be any commercially available computing devices. A client application (e.g., 121) process may be active on one or more user computing devices 120a-120n. The corresponding server process may be active on the data management server 112. The client application process and the corresponding server process may communicate with each other over the network 150, thus providing distributed functionality and allowing multiple client applications to take advantage of the information-gathering capabilities of the content management system 110.

The data management system 100 may have a data duplication controller 130 for data duplication management. The data duplication controller 130 may have a data extractor 131 for extracting changes to data stored in the data repositories 111, a data flattener 132 for generating one or more CSV files for the extracted data, a packaging controller 133 for generating a data change file for the CSV files, a listing or catalog API 134 for enabling access to the data change file, and a data access API 135 for accessing to the data change file. Details of the data duplication controller 130 will be described in detail with reference to FIGS. 6 and 7.

The data storage architecture 160 may be, e.g., a data warehouse, and may be operated by a third party.

In one implementation, the data management system 110 may be a multi-tenant system where various elements of hardware and software may be shared by one or more customers. For instance, a server may simultaneously process requests from a plurality of customers, and the data repositories 111 may store data for a plurality of customers. In a multi-tenant system, a user is typically associated with a particular customer. In one example, a user could be an employee of one of a number of pharmaceutical companies which are tenants, or customers, of the data management system 110.

In one embodiment, the data management system 110 may run on a cloud computing platform. Users can access content on the cloud independently by using a virtual machine image, or purchasing access to a service maintained by a cloud database provider.

In one embodiment, the data management system 110 may be provided as Software as a Service ("SaaS") to allow users to access the content management system 110 with a thin client.

Figure 1B:
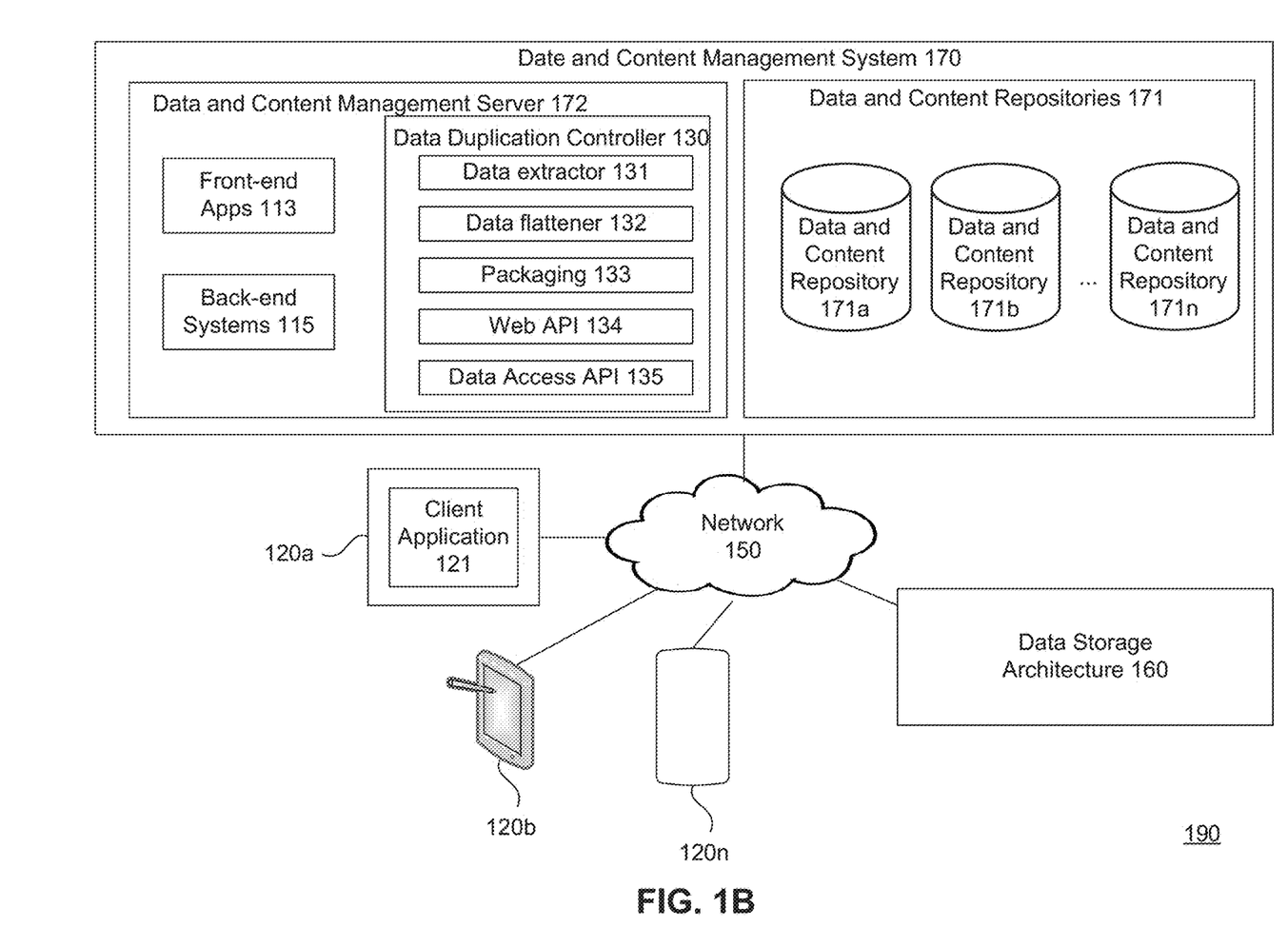
FIG. 1B illustrates an example high level block diagram of an enterprise content management architecture wherein the present invention may be implemented.

FIG. 1B illustrates an example high level block diagram of an enterprise data and content management architecture 190 wherein the present invention may be implemented. The enterprise may be a business, or an organization. As shown, the architecture 190 may include a data and content management system 170, a plurality of user computing devices 120a, 120b, . . . 120n, and a data storage architecture 160 coupled to each other via a network 150. The data and content management system 170 may include a data and content repositories 171 and a data and content management server 172. The data and content repositories 171 may have two or more data and content repositories, e.g., 171a, 171b, . . . and 171n.

The data and content repositories 171 may store data and content that client applications (e.g., 121) in user computing devices 120a-120n may access and may be any commercially available storage devices. As will be described with reference to FIG. 2 below, each data and content repository (e.g., 171a, 171b or 171n) may store a specific category of content, be the source repository for its content, and allow users to interact with its content in a specific business context.

The data and content management server 172 is typically a remote computer system accessible over a remote or local network, such as the network 150. The data and content management server 172 could be any commercially available computing devices. A client application (e.g., 121) process may be active on one or more user computing devices 120a-120n. The corresponding server process may be active on the data and content management server 172, as one of the front-end applications 113 described with reference to FIG. 2. The client application process and the corresponding server process may communicate with each other over the network 150, thus providing distributed functionality and allowing multiple client applications to take advantage of the information-gathering capabilities of the data and content management system 190.

The data and content management system 190 may have a data duplication controller 130 for data access management, as will be described in detail with reference to FIGS. 6 and 7.

The data storage architecture 160 may be, e.g., a data warehouse, and may be operated by a third party.

Although the front-end applications 113, back-end systems 115, the data access controller 130 are shown in one server, it should be understood that they may be implemented in multiple computing devices.

In one implementation, the data and content management system 190 may be a multi-tenant system where various elements of hardware and software may be shared by one or more customers. For instance, a server may simultaneously process requests from a plurality of customers, and the data and content repositories 171 may store content for a plurality of customers. In a multi-tenant system, a user is typically associated with a particular customer. In one example, a user could be an employee of one of a number of pharmaceutical companies which are tenants, or customers, of the data and content management system 190.

In one embodiment, the data and content management system 190 may run on a cloud computing platform. Users can access content on the cloud independently by using a virtual machine image, or purchasing access to a service maintained by a cloud database provider.

In one embodiment, the data and content management system 190 may be provided as Software as a Service ("SaaS") to allow users to access the content management system 110 with a thin client.

Figure 2:
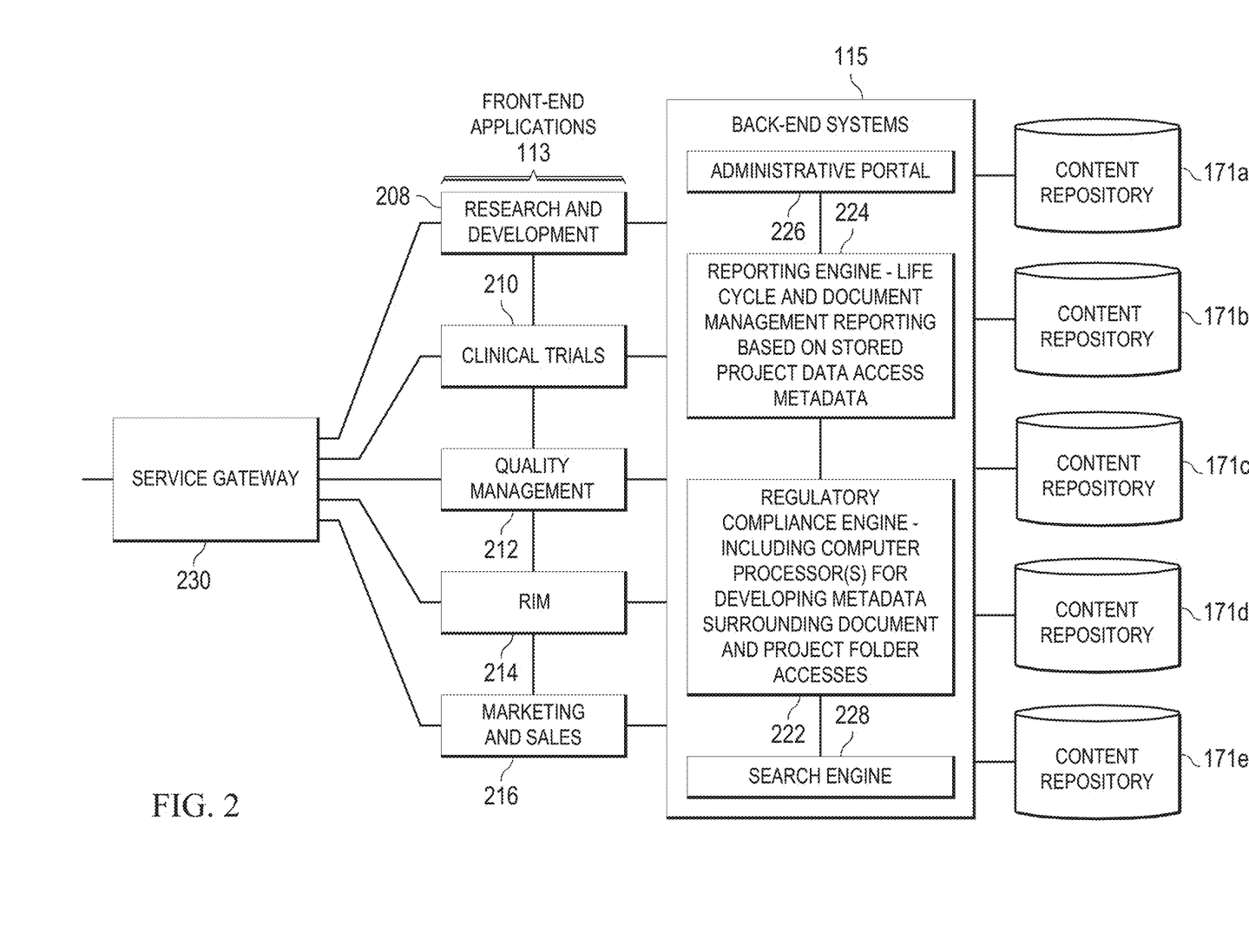
FIG. 2 provides a description of the content management system with additional specific applications and interfaces connected thereto.

FIG. 2 provides a description of the data and content management system 170 with additional specific applications and interfaces connected thereto. In an embodiment, this data and content management system 170 is a cloud-based or distributed network based system for consolidating an enterprise's data, oftentimes integrating multiple content repositories in an enterprise into a single system having coordinated control, measuring, and auditing of data creation, access and distribution.

In an embodiment of the data and content management system 170 for the life sciences industry, as illustrated in the figure, this data and content management system 170 can include specific data collections for the following areas and/or business process-specific front-end applications 113:

A Research & Development (R&D) front-end application 208 provides for an aggregation of materials in support of research and initial clinical trial submissions through building organized and controlled content repositories within the data and content management system 170, more specifically, the content repository 171a. Elements that can be stored, organized, and managed through this front-end include submission bills of materials, Drug Information Association (DIA) reference models support, and submission-ready renderings. This front-end 208 is designed to provide an interface to the data and content management system 170 whereby researchers, contract research organizations (CROs), and other collaboration partners can access and/or distribute content through a single controlled document system.

A clinical trials front-end application 210 provides for faster and more organized access to trial documents and reports, while supporting seamless collaboration between sponsors, CROs, sites, investigators and other trial participants. Specific features both case study and site administration as well as support the DIA trial master file (TMF) reference model. Having this front-end application providing access to the data and content management system 170 further provides for efficient passing off of content, e.g., in the content repository 171b, between this phase and other phases of the life sciences development process.

A manufacturing and quality application 212 enables the creation, review, approval and distribution of controlled documents across the organization and with external partners in the context of materials control and other manufacturing elements. The application 212 provides functionality in support of the manufacturing process including watermarking, controlled print, signature manifestation and "Read and Understood" signature capabilities. The documents and metadata associated with this process is managed and stored in the data and content management system 170, or more specifically, the content repository 171c, whereby it can be assured that the related documents are not distributed in contravention of law and company policy. The application 212 also manages business processes including change control, complaints, corrective actions and preventive actions ("CAPA"), deviation and audits.

A regulatory information management ("RIM") application 214 provides for management of regulatory information, submission processes and submission reports, which may include, e.g., safety reporting, product registrations, health authority interactions, central and local requirements, submissions to health authorities, and health authority information management. The product registration information may include, e.g., the associated product information, application information, application date, registration details, key registration dates, marketing status, and marketing details. The health authority interactions may include bidirectional interactions with health authorities globally, including correspondences, commitments and queries. Pharmaceutical companies may submit registration applications to health authorities to get approval for selling products in a country. The registration process may take a few months and status of the registration may change over time. User may see global registrations and their status in one or more submission reports. Related documents may be stored in the content repository 171d.

A marketing and sales application 216 provides an end-to-end solution for the development, approval, distribution, expiration and withdrawal of promotional materials. Specific features include support for global pieces, approved Form FDA 2253 (or similar international forms) form generation, online document, and video annotation, and a built-in digital asset library (DAL). Again, the communications may be through the data and content management system 170, and the promotional materials may be stored in the content repository 171e.

The data and content management system 170 may have a number of back-end system applications 115 that provide for the management of the data, forms, and other communications in. For example, the back-end systems applications 115 may include a regulatory compliance engine 222 to facilitate regulatory compliance, including audit trail systems, electronic signatures systems, and system traceability to comply with government regulations, such as 21 CFR Part 11. Annex 11 and GxP-related requirements. The regulatory compliance engine 222 may include processors for developing metadata surrounding document and project folder accesses so from a regulatory compliance standpoint it can be assured that only allowed accesses have been permitted. The regulatory compliance engine 222 may further includes prevalidation functionality to build controlled content in support of installation qualification (IQ) and/or operational qualification (OQ), resulting in significant savings to customers for their system validation costs.

The back-end systems 115 may contain a reporting engine 224 that reports on documents, their properties and the complete audit trail of changes. These simple-to-navigate reports show end users and management how content moves through its life cycle over time, enabling the ability to track 'plan versus actual' and identify process bottlenecks. The reporting engine may include processors for developing and reporting life cycle and document management reporting based on stored project data and access metadata relative to documents, forms and other communications stored in the data and content management system 170.

The back-end systems 115 can include an administrative portal 226 whereby administrators can control documents, properties, users, security, workflow and reporting with a simple, point-and-click web interface. Customers also have the ability to quickly change and extend the applications or create brand new applications, including without writing additional software code.

The back-end systems 115 may include a search engine 228 whereby the data and content management system 170 can deliver simple, relevant and secure searching.

The data and content management system 170 may have more back-end systems.

In providing this holistic combination of front-end applications 113 and back-end systems 115, the various applications can further be coordinated and communicated with by the service gateway 230, which in turn can provide for communications with various web servers and/or web services APIs. Such web servers and/or web services APIs can include access to the content and metadata layers of some or all of the various front-end applications 113 and back end systems 115, enabling seamless integration among complementary systems.

In the context of the described embodiments, updates in one repository, e.g., the content repository 171c for the quality management application front-end application 212, may be shared with a repository (e.g., the RIM repository 171d) for another front-end application (e.g., the RIM application 214).

The data and content management system 170 may store content for other industries.

Figure 3:
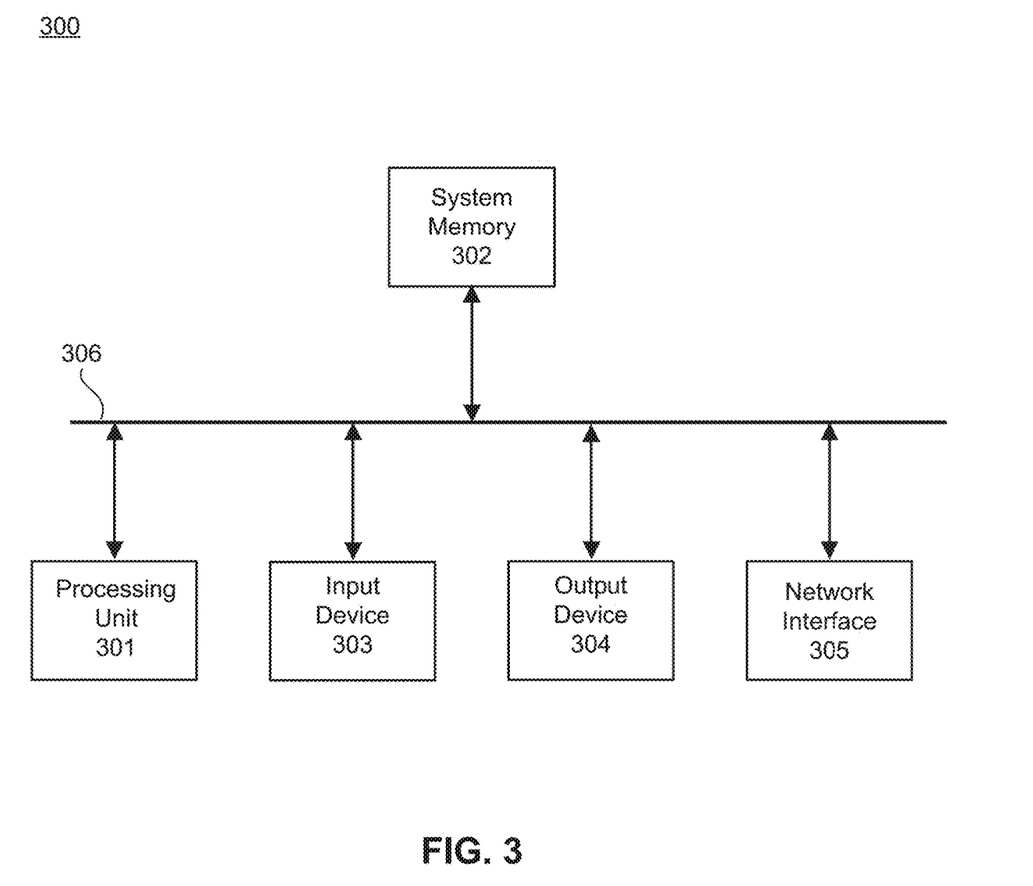
FIG. 3 illustrates an example block diagram of a computing device.

FIG. 3 illustrates an example block diagram of a computing device 300 which can be used as the user computing devices 120a-120n, and the data management server 112 and data and content management server 172 in FIG. 1. The computing device 300 is only one example of a suitable computing environment and is not intended to suggest any limitation as to scope of use or functionality. The computing device 300 may include a processing unit 301, a system memory 302, an input device 303, an output device 304, a network interface 305 and a system bus 306 that couples these components to each other.

The processing unit 301 may be configured to execute computer instructions that are stored in a computer-readable medium, for example, the system memory 302. The processing unit 301 may be a central processing unit (CPU).

The system memory 302 typically includes a variety of computer readable media which may be any available media accessible by the processing unit 301. For instance, the system memory 302 may include computer storage media in the form of volatile and/or nonvolatile memory such as read only memory (ROM) and/or random access memory (RAM). By way of example, but not limitation, the system memory 302 may store instructions and data, e.g., an operating system, program modules, various application programs, and program data.

A user can enter commands and information to the computing device 300 through the input device 303. The input device 303 may be, e.g., a keyboard, a touchscreen input device, a touch pad, a mouse, a microphone, and/or a pen.

The computing device 300 may provide its output via the output device 304 which may be, e.g., a monitor or other type of display device, a speaker, or a printer.

The computing device 300, through the network interface 305, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 305 may be configured to allow the computing device 300 to transmit and receive data in a network, for example, the network 150. The network interface 305 may include one or more network interface cards (NICs).

Figure 4:
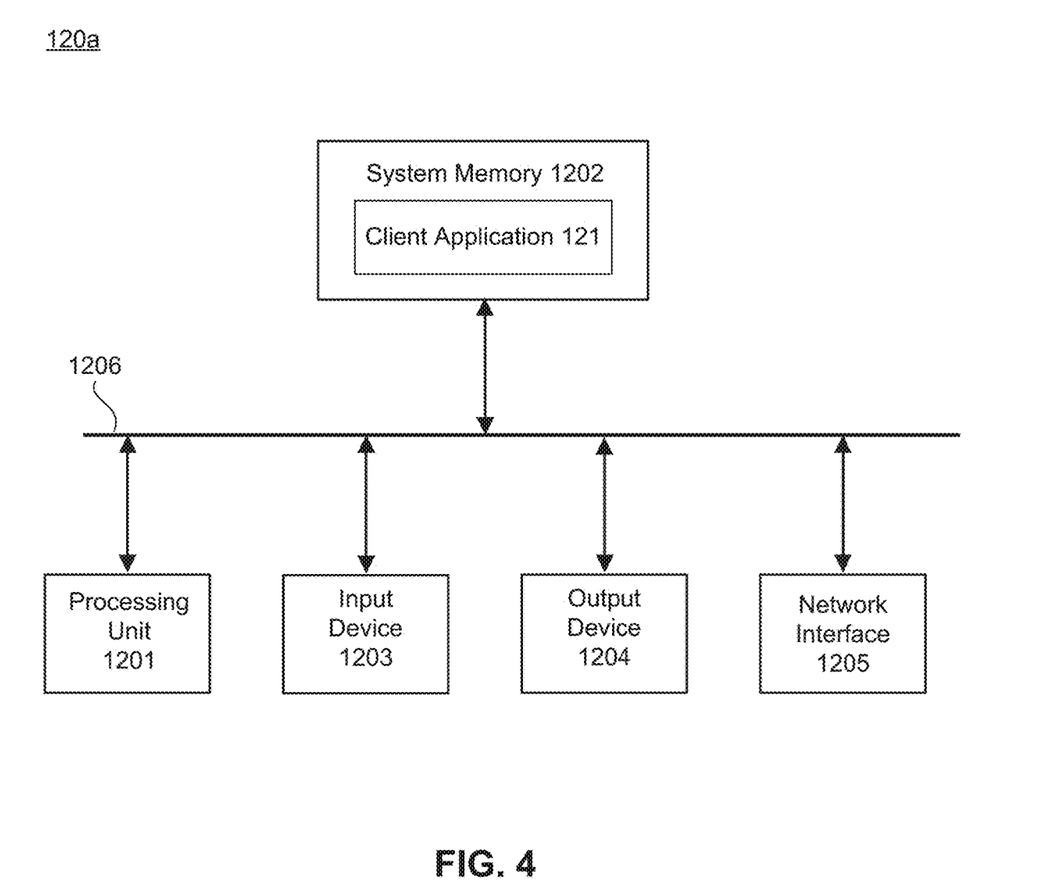
FIG. 4 illustrates an example high level block diagram of a user computing device.

FIG. 4 illustrates an example high level block diagram of a user computing device (e.g., 120a) wherein the present invention may be implemented. The user computing device 120a may be implemented by the computing device 300 described above, and may have a processing unit 1201, a system memory 1202, an input device 1203, an output device 1204, and a network interface 1205, coupled to each other via a system bus 1206. The system memory 1202 may store the client application 121.

Figure 5:
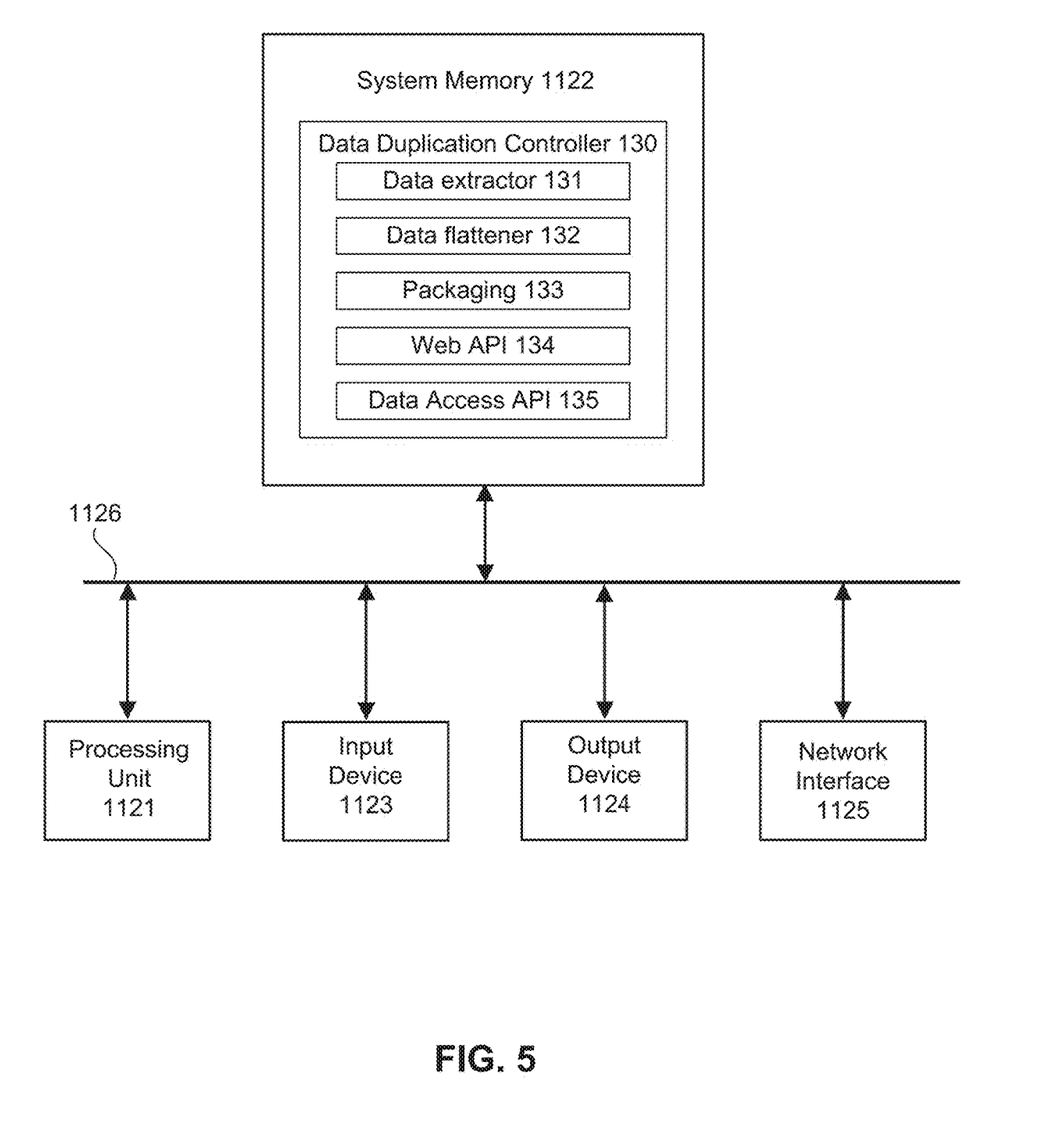
FIG. 5 illustrates an example high level block diagram of the data management server according to one embodiment of the present invention.

FIG. 5 illustrates an example high level block diagram of the data management server 112 according to one embodiment of the present invention. The data management server 112 may be implemented by the computing device 300, and may have a processing unit 1121, a system memory 1122, an input device 1123, an output device 1124, and a network interface 1125, coupled to each other via a system bus 1126. The system memory 1122 may store the data access controller 130.

The present invention provides a new class of API that enables high speed data access to applications in the data management system (e.g., 110) and high-speed data duplication from the data management system (e.g., 110) to a data storage architecture (e.g., 160).

In one embodiment, data in the data management system is made available at a predetermined schedule as a full copy (e.g., daily), with incremental change files (e.g., every 15 minutes).

In one embodiment, the full scope of data is made available.

In one embodiment, an incremental file is based on a previous incremental file or a previous full file.

In one embodiment, the files can be platform files which are standard on objects (one per object) and documents (one file for all document types).

In one embodiment, the data duplication controller 130 may run as a system with a specific permission, so the full data is available without regard to row, field or document security.

In one embodiment, the format of the files is fully described using metadata and is itself an API. Any changes will be upward compatible.

The approach of duplicating data of the present invention can achieve high performance and consistency, and short latency. In one embodiment, the latency is not more than 15 minutes. For example, a file produced at 6:00 is consistent, and includes all data as of at least 5:45.

Figure 6:
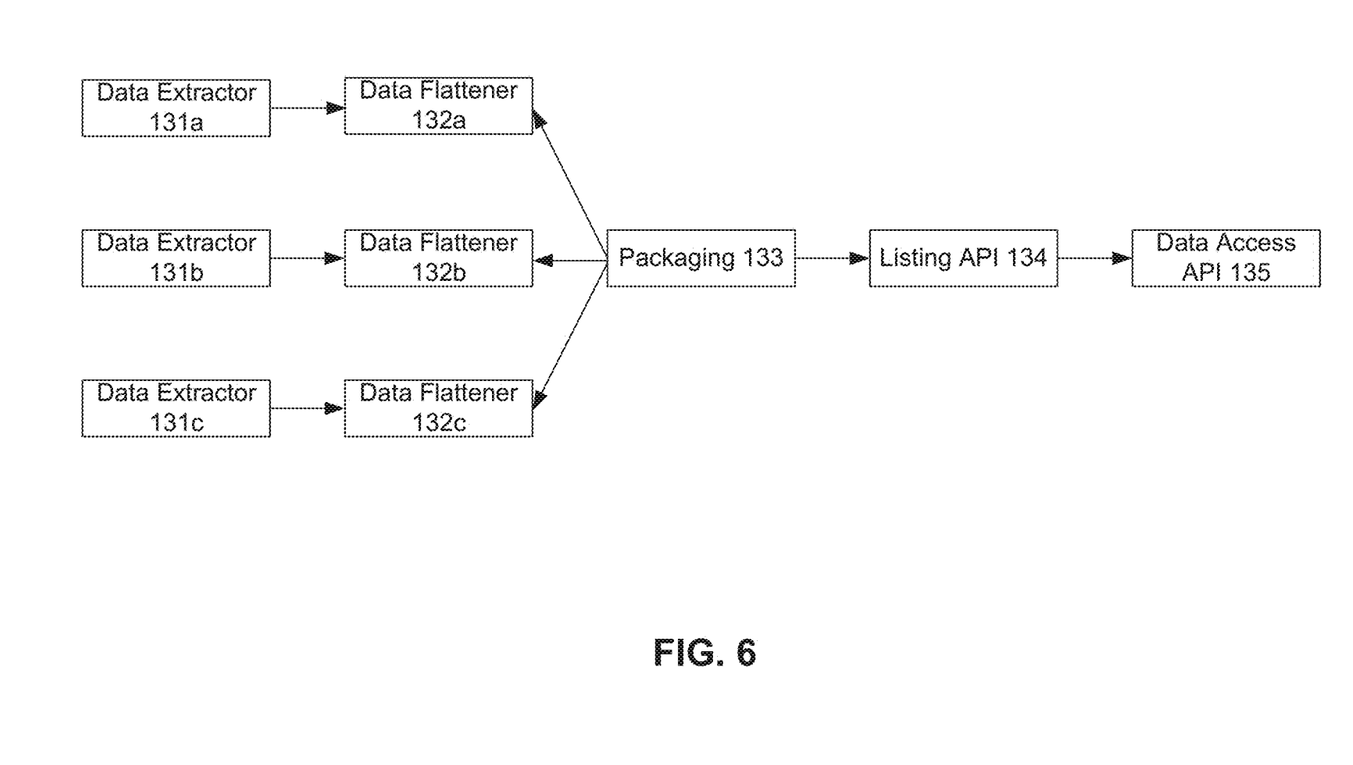
FIG. 6 illustrates a block diagram of the data duplication controller for managing data duplication in the database system 100 (as shown in FIG. 1A) or the content management system 190 (as shown in FIG. 1B) according to one embodiment of the present invention.

As shown in FIG. 6, the data duplication controller 130 may have a number of data extractors 131a, 131b, and 131c, a number of data flatteners 132a, 132b, and 132c, a data packaging controller 133, and a listing or catalog API 134.

In one embodiment, the data flattener 132 is responsible for querying data, transforming, and writing to a flat file, which could be a CSV, JSON, XML, or Parquet file. The data flatteners may pull for changes and append them to an archive file, e.g., a zip file, and could be standard platform flatteners and app specific flatteners. In one embodiment, the data flattener may create two files: one is for tracking incremental changes (e.g., every 15 minutes), and the other one is for maintaining a full replica of the data in CSV files. The data flattener 132 may concatenate the data and de-duplicate the data.

In one embodiment, system flatteners may be used for, e.g., data objects, audit trails, and doctypes, and may produce flat files for each data object, doctype, and audit log.

In one embodiment, a Data Extraction service may be performed by the flatteners to orchestrate the data extracted from tables in the data management system into flat files. The flatteners may extract, transform, and write flat files for a specific extract.

An Extract is a named entity that can be pulled from the data management system. Each extract may be manifested as a CSV file. In one embodiment, extracts are defined in the data management system metadata as Directdataextract components in order to inform the extraction service and a describe API. A subcomponent Extractcolumn defines each column in the CSV file.

Extracts may be added when appropriate to extend the set of data available to the duplication management of the present invention. For example, when a customer creates a custom object, it may be as added as an Extract.

Extract CSV may follow standard conventions for format. In one embodiment, they may include:

Name—the file name of a Directdatafile is vaultid-directdatafile.name-{full|inc}.csv Header Row—the first row of the csv provides field names. For system flatteners, the field names will be the same as configured in the data management system.

ID—the first column of the file has a row identifier (id). This will be the ID of the record in data management system.

Relationships—a relationship column will reference the ID of the related record. The user will use the metadata API to identify the referenced datafile.

Standard Columns modified_date_v modified_by_v file—pointer to content source.

In one embodiment, the packaging controller 133 is a publisher. The publisher may read the flattened data from the data flatteners 132, package the flat files into a data change file, and publish the data change file to the listing API 134, and could be standard platform publishers and app specific publishers. In one embodiment, the publishers may run on a predetermined schedule (e.g., every 15 minutes), pull from flat files and publish Extracts based on a consistent timestamp so that they are available to the listing API 134.

The data change file may be, e.g., a zip file, and may provide a complete and consistent set of Extract files for a given data repository. The set makes it easy for the user to understand which resource to pull from the data repository, rather than having several thousand individual extract files.

The zip files are available via the data access API 135.

An REST API may be used by tool and integration developers to interact with the zip file. Using the REST API, users can discover, describe, and download data updates. The payload of a dataset is designed to be easily consumed into a data warehouse or data lake.

Figure 7:
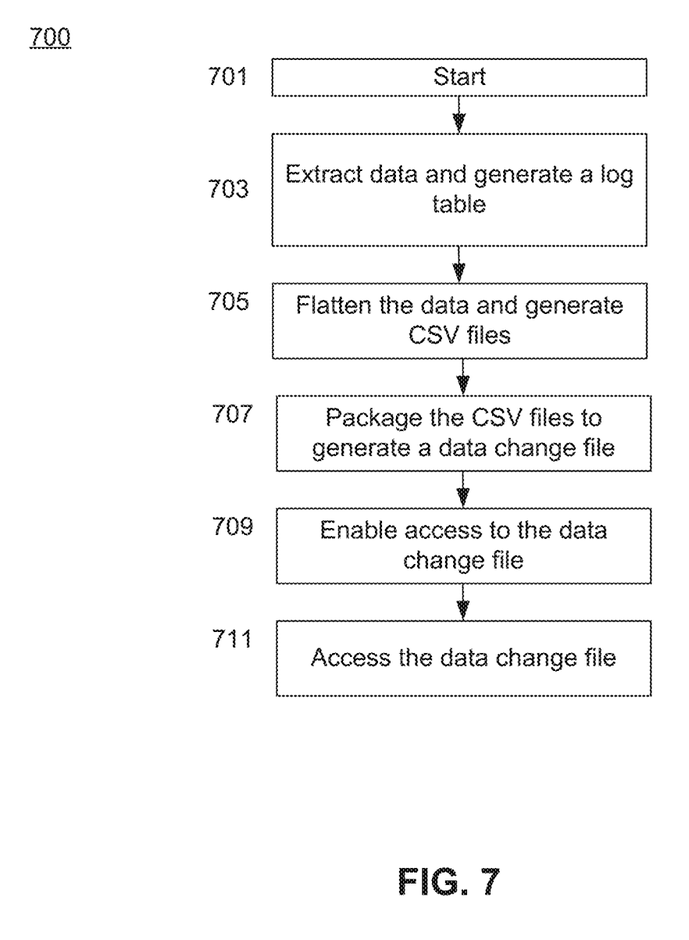
FIG. 7 illustrates a flowchart of a method for managing data duplication in the database system 100 (as shown in FIG. 1A) or the content management system 190 (as shown in FIG. 1B) according to one embodiment of the present invention.

FIG. 7 illustrates a flowchart of a method for duplicating data in the data management system 100 (as shown in FIG. 1A) or data and content management system 190 (as shown in FIG. 1B) according to one embodiment of the present invention. The process may start at 701.

As data is being updated in the system 100 or 190, a copy of the updated data is being written to a table for collecting all the changes at 703. In one embodiment, when a record is updated in an application, a corresponding record is written to a log object/table to log in the changes.

An extract is a configuration used to extract an object. In one embodiment, an extract may be defined for each object/table and a number of extracts may be defined. For example, a person object may be defined as an extract, and a country object may be defined as another extract.

In one embodiment, the log table may capture and temporarily log data changes and be cleaned after a predetermined period of time, e.g., 3 days.

A data flattener (e.g., 132) may run at a predetermined time interval, e.g., every 15 minutes, and produce a CSV file at 705 for the changes within the predetermined time interval to get the updated data out. The data flattener may flatten the data and turn the data into the CSV format.

In one embodiment, a CSV file may be produced for each log object/table. For an extract, there may be one or more CSV files to store updates. In one embodiment, creates or updates may be stored in one file, and deletes may be stored in a separate file, so there may be two CSV files for one extract.

Each CSV file has a start time and a stop time. The CSV file may include all object rows and deletes that have been modified on or after the start time and on or before the stop time. In one embodiment, the time stamp is the time of writing, not the time of commit.

The CSV files can be full or incremental. In one embodiment, a full file is produced every day with a stop time of 00:00 of the next day. An incremental is produced with stop times in 15 minute intervals. For example, the first incremental stop time in a day is 00:15 with a start time of 00:00 the day before. That last incremental has a start time of 23:45 and a stop time of 00:00 on the next day. In one embodiment, incremental and full files are produced as soon as possible after the stop time but never later than 15 minutes after the stop time. In one embodiment, all times for the present invention are GMT.

At 707, a data change file may be generated by a packaging controller (e.g., 133) to package all the CSV files for all the extracts. In one embodiment, the data change file is a zip file.

At 709, the data change file may be made available for access. In one embodiment, a listing API (e.g., 134) may list the data change files that are available.

At 711, the data change file may be accessed, e.g., downloaded via a data access API (e.g., 135).

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

What is claimed is:

1. A computer-implemented method for duplicating data including a first data object and a second data object from a data management system, wherein the data management system comprises a first repository, a second repository and a data duplication controller, the method comprising:
    writing data changes to a log table for collecting the data changes in the data management system;
    extracting data changes by a data extractor in the data duplication controller;
    running a data flattener in the data duplication controller to generate flattened data for the extracted data changes, and creating a first flat file and a second flat file for the flattened data for the extracted data changes, wherein the first flat file is for a first extract of the first data object in the document management system, wherein the first flat file includes data of the first data object but not the second data object, wherein the second flat file is for a second extract of the second data object in the document management system, and wherein the second flat file includes data of the second data object but not the first data object;
    receiving the first and second flat files from the data flattener at a first predetermined time interval, and creating a first data change file to package the first flat file and the second flat file for the flattened data for the extracted data changes by a packaging controller in the data duplication controller; and
    presenting the first data change file with a listing application programming interface (API) in the data duplication controller to enable access to the data change file.

2. The method of claim 1, wherein the first predetermined time interval is 15 minutes.

3. The method of claim 1, further comprising: running the data flattener at a second predetermined time interval to extract the data changes within the second predetermined time interval and generating a first incremental change flat file.

4. The method of claim 3, wherein the second predetermined time interval is 15 minutes.

5. The method of claim 1, further comprising: maintaining a full copy of the flattened data.

6. The method of claim 1, wherein the generating flattened data for the extracted data changes further comprises concatenating the data by the data flattener.

7. The method of claim 1, wherein the generating flattened data for the extracted data changes further comprises de-duplicating the data by the data flattener.

8. The method of claim 1, wherein the data is duplicated from the data management system to a data storage system.

9. The method of claim 8, wherein the data storage system is a data warehouse.

10. The method of claim 1, wherein the first data change file is a zip file.

11. The method of claim 1, wherein the first data change file is accessed by a data access application programming interface (API).

12. The method of claim 1, further comprising: cleaning the log table at a third predetermined time interval.

13. The method of claim 12, wherein the third predetermined time interval is 3 days.

14. The method of claim 1, further comprising: creating a flat file for each log table.

15. The method of claim 1, further comprising: storing data updates in a third flat file.

16. The method of claim 15, further comprising: storing data deletes in a fourth flat file.

17. The method of claim 1, wherein the first flat file has a first start time and a first stop time, and the first flat file comprises data changes on or after the first start time and on or before the first stop time.

18. The method of claim 1, wherein the first repository is a data repository.

19. The method of claim 1, wherein the first repository is a data and content repository.

20. The method of claim 1, further comprising:
    storing data updates in a third flat file,
    wherein the third flat file does not include data deletes; and
    storing the data deletes in a fourth flat file,
    wherein the fourth flat file does not include the data updates.

21. A data management system, comprising a first repository, a second repository and a data duplication controller, wherein the data duplication controller comprises:
    a data extractor for extracting data changes in the data management system;
    a data flattener for generating flattened data for the extracted data changes, and creating a first flat file and a second flat file for the flattened data for the extracted data changes, wherein the first flat file is for a first extract of a first data object in the document management system, wherein the first flat file includes data of the first data object but not a second data object, wherein the second flat file is for a second extract of the second data object in the document management system, and wherein the second flat file includes data of the second data object but not the first data object;
    a packaging controller for receiving the first and second flat files from the data flattener at a first predetermined time interval, and creating a first data change file to package the first flat file and the second flat file for the flattened data for the extracted data changes; and
    a listing application programming interface (API) for presenting the first data change file to enable access to the data change file.

22. The data management system of claim 21, wherein the data flattener is further for:
    storing data updates in a third flat file, wherein the third flat file does not include data deletes; and storing the data deletes in a fourth flat file,
wherein the fourth flat file does not include the data updates.

* * * * *